United States Patent
Yang et al.

(10) Patent No.: US 6,977,824 B1
(45) Date of Patent: Dec. 20, 2005

(54) CONTROL CIRCUIT FOR CONTROLLING OUTPUT CURRENT AT THE PRIMARY SIDE OF A POWER CONVERTER

(75) Inventors: Ta-yung Yang, Milpitas, CA (US); Guo-Kiang Hung, Sindian (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/914,802

(22) Filed: Aug. 9, 2004

(51) Int. Cl.[7] ............................................. H02M 3/335
(52) U.S. Cl. .................. 363/21.16; 363/21.17
(58) Field of Search .......................... 363/21.12, 21.16, 363/21.17, 56.01

(56) References Cited

U.S. PATENT DOCUMENTS

| | | | | |
|---|---|---|---|---|
| 6,078,510 A | * | 6/2000 | Spampinato et al. | ..... 363/21.13 |
| 6,118,675 A | * | 9/2000 | Lionetto et al. | ......... 363/21.13 |
| 6,842,350 B2 | * | 1/2005 | Yamada et al. | .......... 363/21.16 |
| 6,912,141 B2 | * | 6/2005 | Konno | .................... 363/21.16 |

* cited by examiner

*Primary Examiner*—Bao Q. Vu
(74) *Attorney, Agent, or Firm*—J. C. Patents

(57) ABSTRACT

A control circuit controlling output current at the primary side of a power converter is provided. A waveform detector generates a current-waveform signal. A discharge-time detector detects a discharge-time of a secondary side switching current. An oscillator generates an oscillation signal for determining the switching frequency of the switching signal. An integrator generates an integrated signal by integrating an average current signal with the discharge-time. The average current signal is generated in response to the current-waveform signal. The time constant of the integrator is correlated with the switching period of the switching signal, therefore the integrated signal is proportional to the output current. An error amplifier amplifies the integrated signal and provides a loop gain for output current control. A comparator controls the pulse width of the switching signal in reference to the output of the error amplifier. Therefore, the output current of the power converter can be regulated.

15 Claims, 9 Drawing Sheets

CONTROL CIRCUIT FOR CONTROLLING OUTPUT CURRENT AT THE PRIMARY SIDE OF A POWER CONVERTER

BACKGROUND OF THE INVENTION

1. Field of the Invention

The present invention relates to a power converter, and more particularly, to the control circuit of the power converter.

2. Description of Related Art

Various power converters have been widely used to provide regulated voltage and current. For safety reasons, galvanic isolation is provided between a primary side and a secondary side of an off-line power converter. In case that the control circuit is configured at the primary side of the power converter, it would be difficult to control an output current of the power converter. Thus it is desirable to provide a control circuit for controlling the output current of the power converter at the primary side of the power converter.

SUMMARY OF THE INVENTION

The present invention provides a control circuit for controlling an output current at a primary side of a power converter. The control circuit comprises a switching control circuit for generating a switching signal for switching a transformer and regulating an output of the power converter. The switching control circuit includes an operational amplifier and a reference voltage developing an error amplifier for output current control, a comparator associated with a PWM circuit controlling the pulse width of the switching signal in response to the output of the error amplifier.

The control circuit further comprises an oscillator generates an oscillation signal for determining the switching frequency of the switching signal. A waveform detector generates a current-waveform signal by sampling a primary side switching current signal. A discharge-time detector coupled to the transformer detects a discharge-time of the secondary side switching current. An integrator produces an integrated signal by integrating an average current signal with the discharge-time. The integrated signal is coupled to the input of the error amplifier, therefore the output current of the power converter is regulated.

The average current signal is produced in response to the current-waveform signal, and the time constant of the integrator is correlated with a switching period of the switching signal. Therefore the integrated signal is proportional to the output current of the power converter.

DESCRIPTION OF THE PREFERRED EMBODIMENTS

Figure 1:
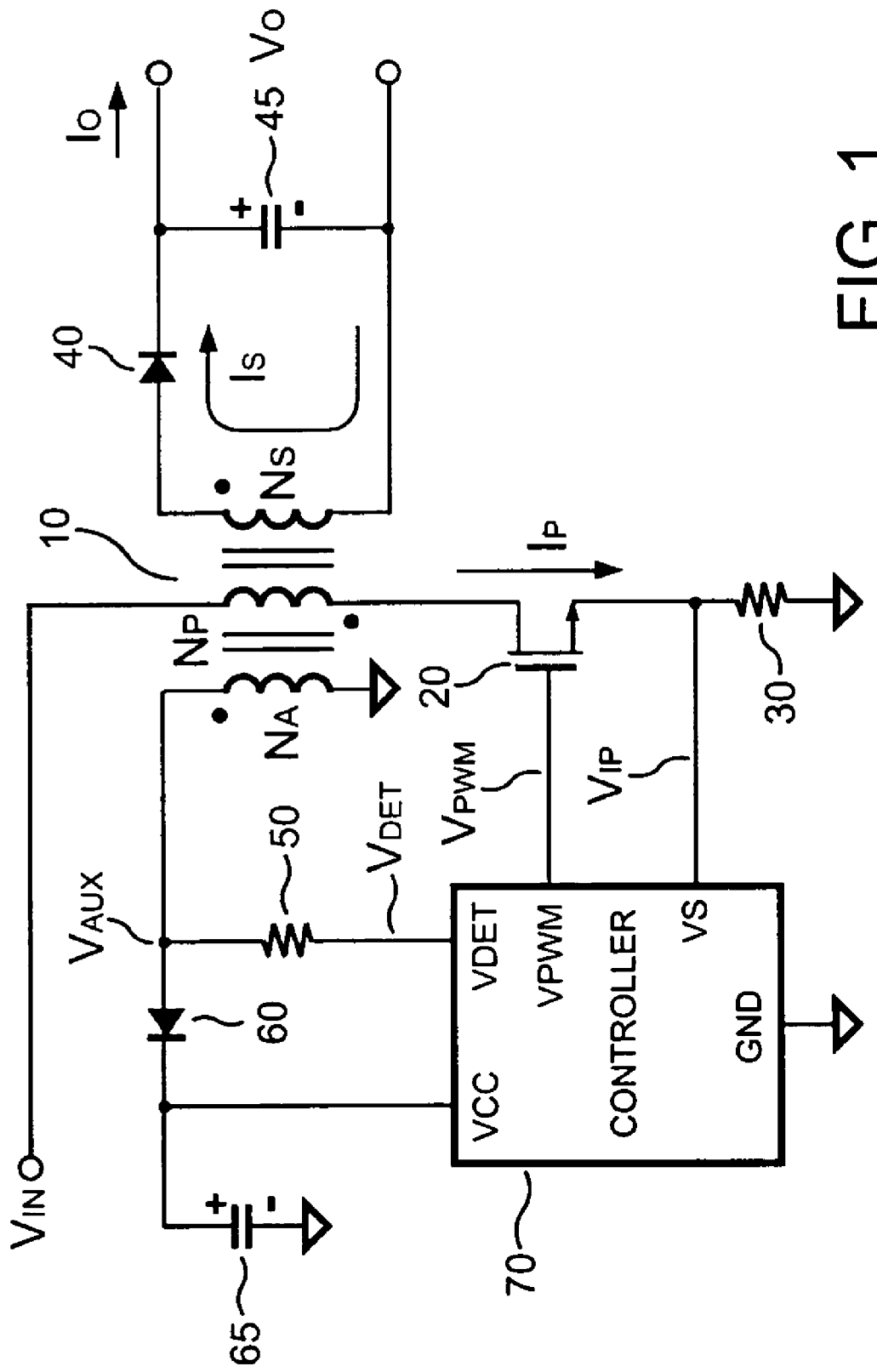
FIG. 1 illustrates a schematic diagram of a power converter according to one embodiment of the present invention.
Figure 2:
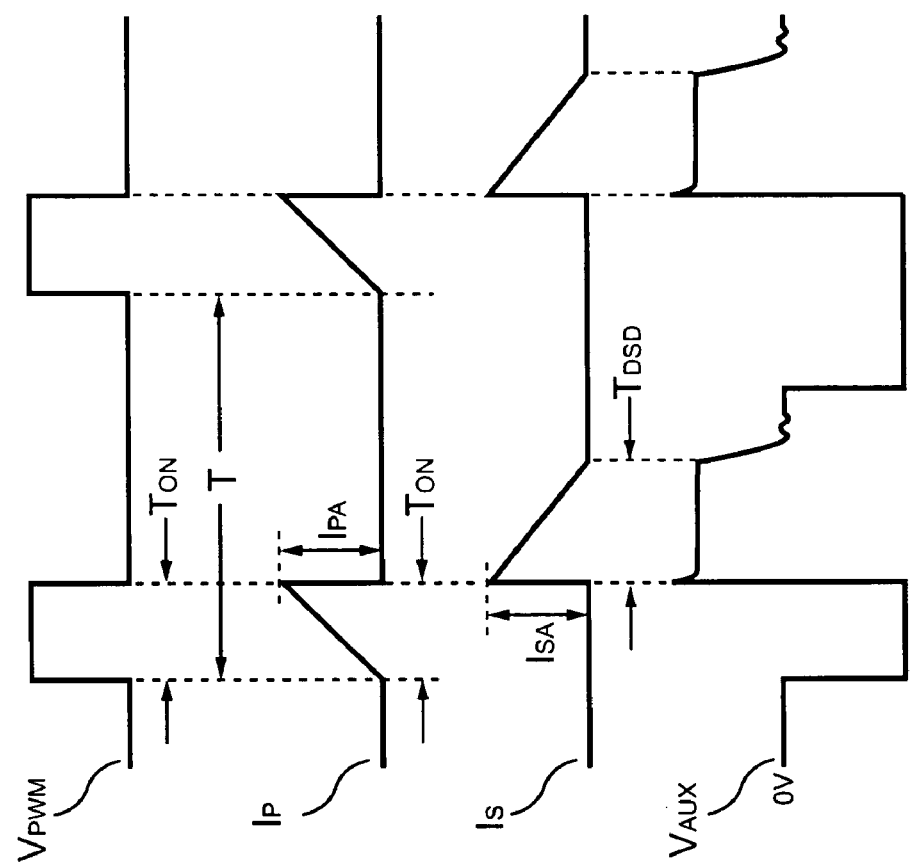
FIG. 2 illustrates the key waveforms of the conventional power converter operating in discontinuous conduction mode according to one embodiment of the present invention.

Referring to FIG. 1, a power converter according to one embodiment of the present invention is illustrated. The power converter comprises a transformer 10 having an auxiliary winding $N_A$, a primary winding $N_P$, and a secondary winding $N_S$. In order to regulate the output voltage $V_O$ and/or the output current $I_O$ of the power converter, a control circuit 70 generates a switching signal $V_{PWM}$ to switch the transformer 10 by switching a transistor 20. Referring to FIG. 2, it illustrates various signal waveforms of the power converter in FIG. 1 operating in discontinuous conduction mode. A primary side switching current $I_P$ is generated as the switching signal $V_{PWM}$ becomes high. A peak value $I_{PA}$ of the primary side switching current $I_P$ is given by, $$I_{PA} = \frac{V_{IN}}{L_P} \times T_{ON} \quad (1)$$

where $V_{IN}$ is an input voltage applied to the transformer 10, $L_P$ is the inductance of the primary winding $N_P$ of the transformer 10, $T_{ON}$ is an on-time of the switching signal $V_{PWM}$.

Once the switching signal $V_{PWM}$ drops to low, the energy stored in the transformer 10 will be delivered to the secondary side of the transformer 10 and to an output of the power converter via a rectifier 40. A peak value $I_{SA}$ of a secondary side switching current $I_S$ can be expressed by, $$I_{SA} = \frac{(V_O + V_F)}{L_S} \times T_{DSD} \quad (2)$$

where $V_O$ is the output voltage of the power converter, $V_F$ is the forward voltage dropped across the rectifier 40, $L_S$ is the inductance of the secondary winding $N_S$ of the transformer 10, and $T_{DSD}$ is a discharging time of the secondary side switching current $I_S$ in discontinuous conduction mode.

Meanwhile, a reflected voltage $V_{AUX}$ is generated at the auxiliary winding $N_A$ of the transformer 10. The reflected voltage $V_{AUX}$ can be given by, $$V_{AUX} = \frac{T_{NA}}{T_{NS}} \times (V_O + V_F) \quad (3)$$

where $T_{NA}$ and $T_{NS}$ are respectively the winding turns of the auxiliary winding $N_A$ and the secondary winding $N_S$ of the transformer 10.

Figure 3:
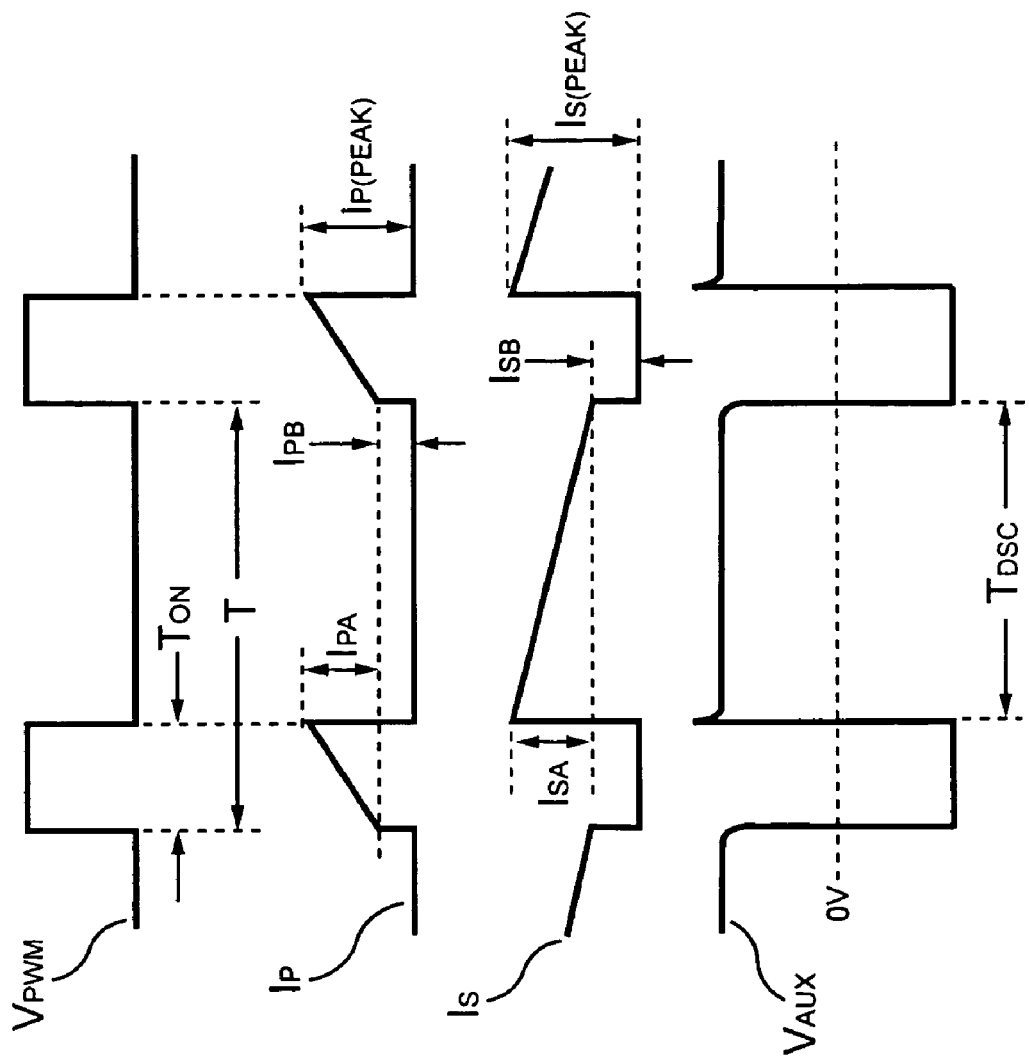
FIG. 3 illustrates the key waveforms of the conventional power converter operating in continuous conduction mode according to one embodiment of the present invention.

As the secondary side switching current $I_S$ falls to zero, the reflected voltage $V_{AUX}$ will start to decrease. This also indicates that the energy of the transformer 10 is fully released at this moment. Therefore, as shown in FIG. 2, the discharging time $T_{DSD}$ in equation (2) can be measured from the falling edge of the switching signal $V_{PWM}$ to the falling point of the reflected voltage $V_{AUX}$. The discontinuous conduction mode of the power converter features that the energy of the transformer 10 is fully released before the next switching cycle starts. The continuous conduction mode features that the energy of the transformer 10 is not fully released as the next switching cycle starts. FIG. 3 shows the waveforms of the power converter operating in continuous conduction mode. A peak value $I_{P(PEAK)}$ of the primary side switching current $I_P$ in continuous conduction mode is given by, $$I_{P(PEAK)} = I_{PA} + I_{PB} \quad (4)$$

$$I_{PA} = \frac{V_{IN}}{L_P} \times T_{ON} \quad (5)$$

where $I_{PB}$ represents the energy stored in the transformer 10.

Once the switching signal $V_{PWM}$ drops to low, the energy stored in the transformer 10 will be delivered to the secondary side of the transformer 10. The secondary side switching current $I_S$ is determined by the primary side switching current $I_P$ and the winding turns of the transformer 10. The peak value $I_{S(PEAK)}$ of the secondary side switching current $I_S$ can be expressed as, $$I_{S(PEAK)} = \frac{T_{NP}}{T_{NS}} \times I_{P(PEAK)} = \frac{T_{NP}}{T_{NS}} \times (I_{PA} + I_{PB}) \quad (6)$$

where $T_{NP}$ is the winding turns of the primary winding $N_P$ of the transformer 10.

Referring to FIG. 1, the control circuit 70 comprises a supply terminal VCC, a voltage-detection terminal VDET, a ground terminal GND, a current-sense terminal VS, and an output terminal VPWM. The output terminal VPWM outputs the switching signal $V_{PWM}$. The voltage-detection terminal VDET is coupled to the auxiliary winding $N_A$ via a resistor 50 for detecting the reflected voltage $V_{AUX}$. The reflected voltage $V_{AUX}$ further charges a capacitor 65 via a rectifier 60 for powering the control circuit 70. A current-sense resistor 30 is coupled from a source of the transistor 20 to a ground reference level for converting the primary side switching current $I_P$ to a primary side switching current signal $V_{IP}$. The current-sense terminal VS is coupled to a current-sense device such as a current-sense resistor 30.

Figure 4:
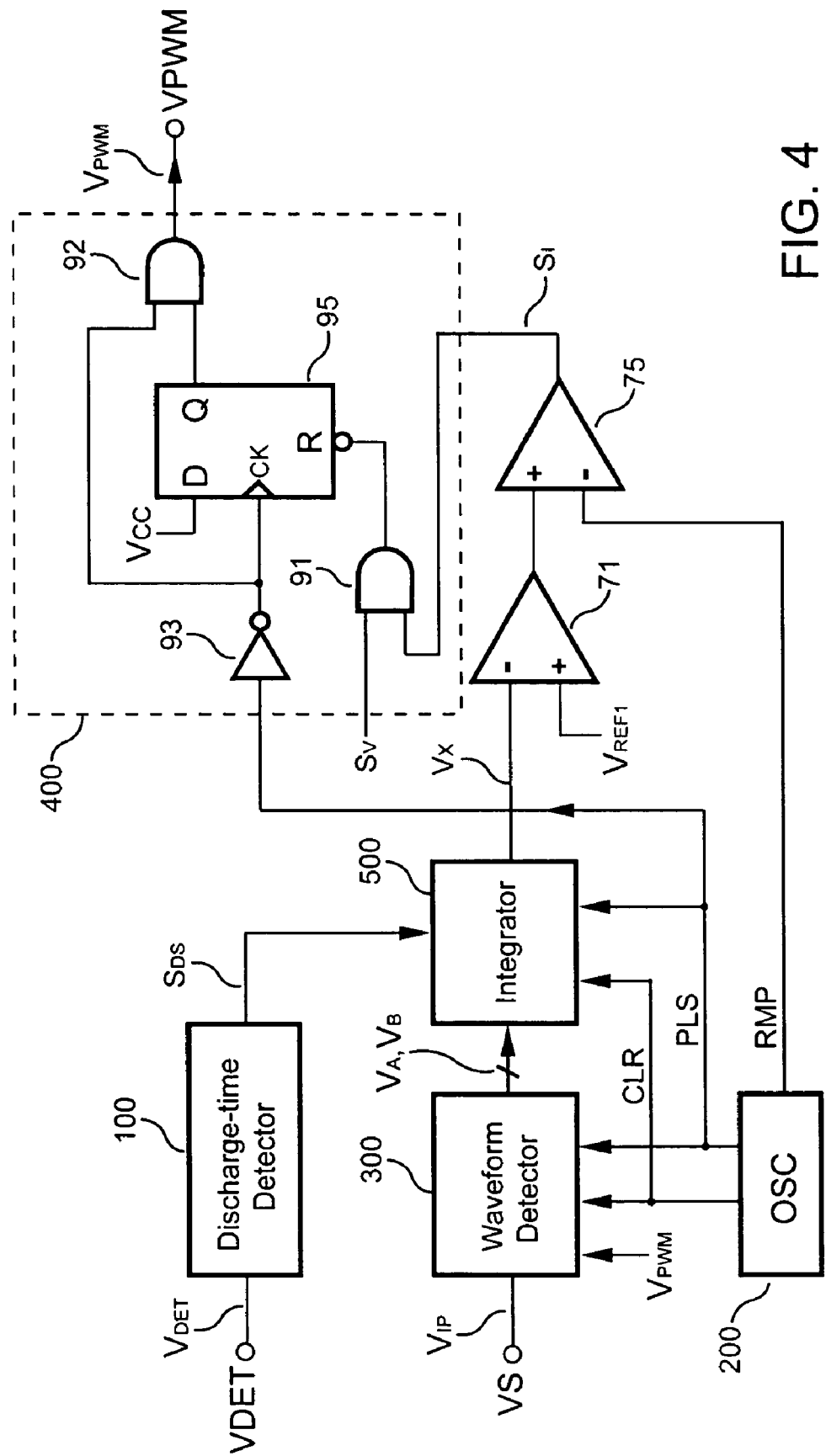
FIG. 4 illustrates a control circuit for output current control according to one preferred embodiment of the present invention.

Referring to FIG. 4, it illustrates a schematic diagram of the control circuit 70 for output current control according to one embodiment of the present invention. A waveform detector 300 generates current-waveform signals $V_A$ and $V_B$ by sampling the primary side switching current signal $V_{IP}$. A discharge-time detector 100 detects the discharging time $T_{DSD}/T_{DSC}$ of the secondary side switching current $I_S$ via the auxiliary winding $N_A$ of the transformer 10. An oscillator 200 generates an oscillation signal PLS to determine the switching frequency of the switching signal $V_{PWM}$.

An integrator 500 is used to generate an integrated signal $V_X$ by integrating an average current signal $I_{AVG}$ with the discharging time $T_{DSD}/T_{DSC}$. The average current signal $I_{AVG}$ is produced in response to current-waveform signals $V_A$ and $V_B$. Both discontinuous conduction mode and continuous conduction mode are considered. A time constant of the integrator 500 is correlated with a switching period T of the switching signal $V_{PWM}$. The integrated signal $V_X$ is therefore proportional to the output current $I_O$ of the power converter.

A switching control circuit includes an operational amplifier 71 and a reference voltage $V_{REF1}$ developing an error amplifier for output current control, a comparator 75 associated with a PWM circuit 400 controlling the pulse width of the switching signal $V_{PWM}$ in response to an output of the error amplifier. The error amplifier amplifies the integrated signal $V_X$ and provides a loop gain for output current control. A current control loop is formed from detecting the primary side switching current $I_P$ to modulating the pulse width of the switching signal $V_{PWM}$. The current control loop controls the magnitude of the primary side switching current $I_P$ in response to the reference voltage $V_{REF1}$. The secondary side switching current $I_S$ is a ratio of the primary side switching current $I_P$ as shown in equation (6). Referring to the waveform in FIG. 2 and/or FIG. 3, the output current $I_O$ of the power converter is the average of the secondary side switching current $I_S$. The output current $I_O$ of the power converter can be expressed by, $$I_O = \left(I_{SB} \times \frac{T_{DS}}{T}\right) + \left(I_{SA} \times \frac{T_{DS}}{2T}\right) \quad (7)$$

where $T_{DS}$ represents $T_{DSD}$ in discontinuous conduction mode or $T_{DSC}$ in continuous conduction mode. The output current $I_O$ of the power converter is therefore regulated.

The primary side switching current $I_P$ is converted to the primary side switching current signal $V_{IP}$ by the current-sense resistor 30. The waveform detector 300 detects the primary side switching current signal $V_{IP}$ and generates current-waveform signals $V_A$ and $V_B$. The integrated signal $V_X$ is designed by, $$V_X = \left(V_B + \frac{V_A - V_B}{2}\right) \times \frac{T_{DS}}{T_I} \quad (8)$$

where $$V_A = \frac{T_{NS}}{T_{NP}} \times R_S \times (I_{SA} + I_{SB}) \quad (9)$$

$$V_B = \frac{T_{NS}}{T_{NP}} \times R_S \times I_{SB} \quad (10)$$

where the $T_I$ is the time constant of the integrator 500.

Referring to equations (7)–(10), the integrated signal $V_X$ can be rewritten as, $$V_X = \frac{T}{T_I} \times \frac{T_{NS}}{T_{NP}} \times R_S \times I_O \quad (11)$$

It is noted that the integrated signal $V_X$ is proportional to the output current $I_O$ of the power converter. The integrated signal $V_X$ increases whenever the output current $I_O$ increases. However, the maximum value of the integrated signal $V_X$ is limited to the value of the reference voltage $V_{REF1}$ through the regulation of the current control loop. Under feedback control of the current control loop, a maximum output current $I_{O(MAX)}$ is given by, $$I_{O(MAX)} = \frac{T_{NP}}{T_{NS}} \times \frac{G_A \times G_{SW} \times V_{R1}}{1 + \left(G_A \times G_{SW} \times \frac{R_S}{K}\right)} \quad (12)$$

where K is a constant equal to $T_1/T$, $V_{R1}$ is the value of the reference voltage $V_{REF1}$, $G_A$ is the gain of the error amplifier, and $G_{SW}$ is the gain of the switching circuit.

If the loop gain of the current control loop is high ($G_A \times G_{SW} \gg 1$), the maximum output current $I_{O(MAX)}$ could be given by, $$I_{O(MAX)} = K \times \frac{T_{NP}}{T_{NS}} \times \frac{V_{R1}}{R_S} \quad (13)$$

Figure 5:
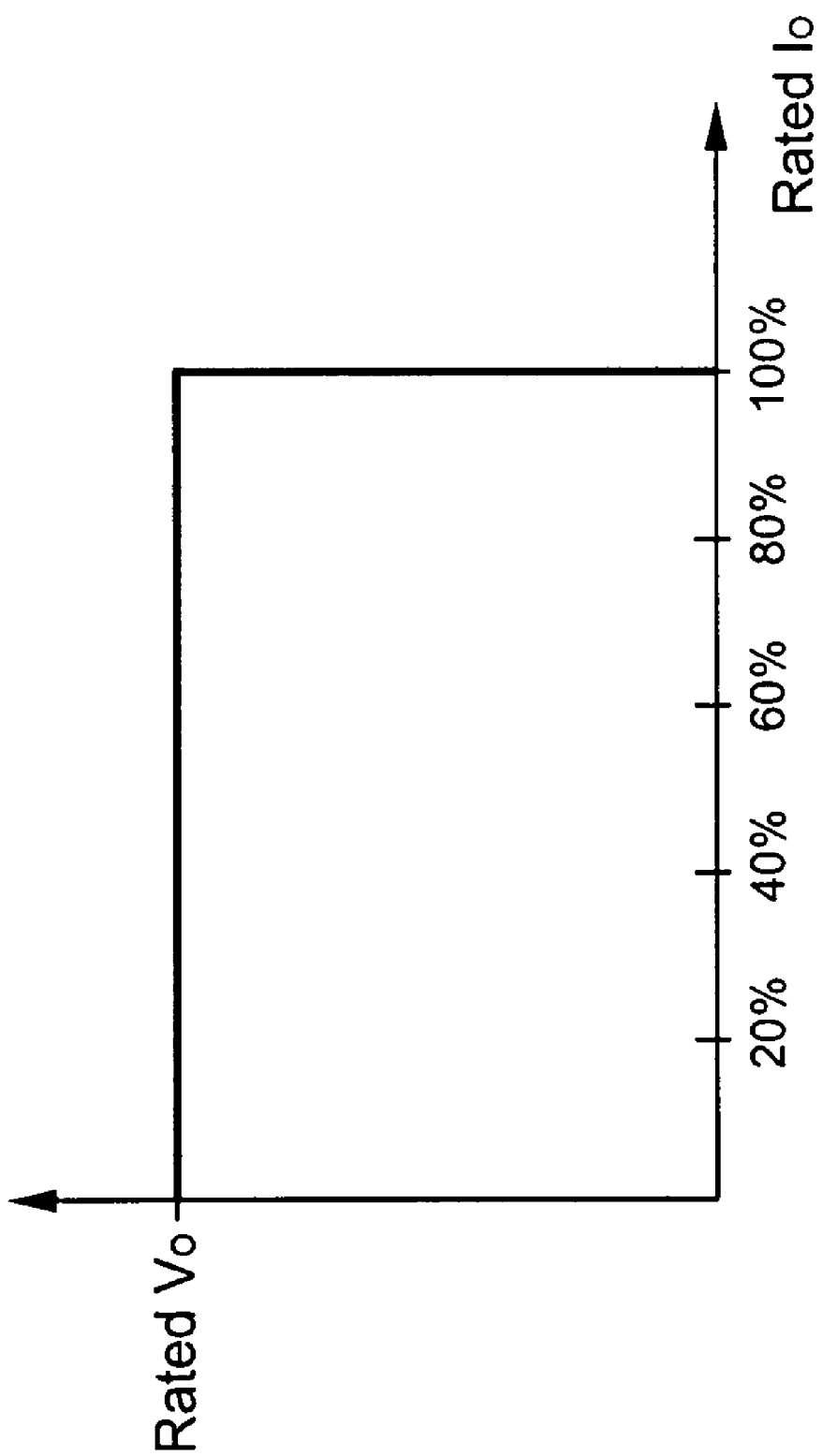
FIG. 5 shows the output voltage curve versus the variation of the output current according to one embodiment of the present invention.

The maximum output current $I_{O(MAX)}$ of the power converter is thus regulated as a constant current in accordance with the reference voltage $V_{REF1}$. FIG. 5 shows the output voltage $V_O$ curve versus the variation of the output current $I_O$.

The PWM circuit 400 outputs the switching signal $V_{PWM}$ for switching the power converter. The PWM circuit 400 according to one embodiment of the present invention comprises a D flip-flop 95, an inverter 93, an AND gate 91 and an AND gate 92. A D input of the D flip-flop 95 is supplied with a supply voltage $V_{CC}$. The oscillation signal PLS sets the D flip-flop 95 through the inverter 93. An output of the D flip-flop 95 is coupled to a first input of the AND gate 92. A second input of the AND gate 92 is coupled to an output of the inverter 93. An output of the AND gate 92 is also an output of the PWM circuit 400, which generates the switching signal $V_{PWM}$. The D flip-flop 95 is reset by an output of the AND gate 91. A first input of the AND gate 91 is supplied with a voltage-loop signal $S_V$. The voltage-loop signal $S_V$ is generated by a voltage control loop, in which the voltage control loop is utilized to regulate the output voltage $V_O$ of the power converter. A current-loop signal $S_I$ generated from an output of the comparator 75 is supplied to a second input of the AND gate 91 for achieving output current control. A positive input of the comparator 75 is coupled to an output of the operational amplifier 71. A negative input of the comparator 75 is supplied with a ramp signal RMP that is provided by the oscillator 200. The voltage-loop signal $S_V$ and the current-loop signal $S_I$ can reset the D flip-flop 95 for shorten the pulse width of the switching signal $V_{PWM}$ so as to regulate the output voltage $V_O$ and the output current $I_O$.

Figure 6:
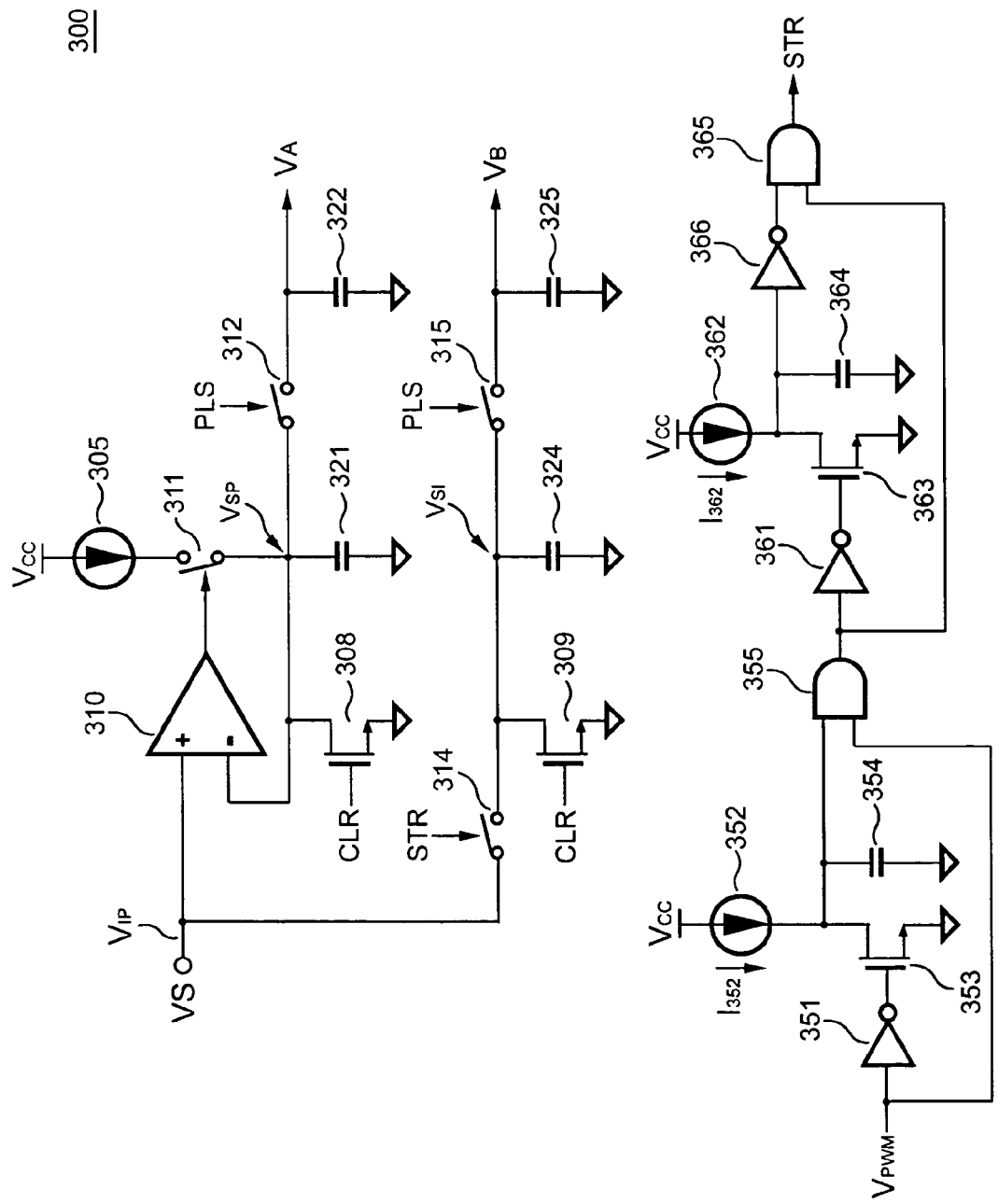
FIG. 6 illustrates a schematic circuit diagram of a waveform detector according to one embodiment of the present invention.

Referring to FIG. 6, it illustrates a schematic circuit diagram of the detector 300 according to one embodiment of the present invention. A comparator 310 has a positive input coupled to the current-sense terminal VS. The value of the primary side switching current signal $V_{IP}$ is proportional to the value of the primary side switching current $I_P$. A capacitor 321 is used to hold the peak value of the primary side switching current signal $V_{IP}$. A negative input of the comparator 310 is coupled to the capacitor 321. A constant current source 305 is applied to charge the capacitor 321. A switch 311 is coupled between the constant current source 305 and the capacitor 321. The switch 311 is turned on/off by an output of the comparator 310. A peak voltage signal $V_{SP}$ is thus generated across the capacitor 321. The peak voltage signal $V_{SP}$ is proportional to the sum current of $I_{PA}$ and $I_{PB}$ shown in FIG. 3. A transistor 308 is coupled in parallel with the capacitor 321 to discharge the capacitor 321. A switch 312 is used for periodically sampling the peak voltage signal $V_{SP}$ from the capacitor 321 to a capacitor 322. Then the current-waveform signal $V_A$ is obtained across the capacitor 322.

A switch 314 is coupled between the current-sense terminal VS and a capacitor 324. The capacitor 324 is used to hold the initial value of the primary side switching current signal $V_{IP}$. An initial voltage signal $V_{SI}$ is therefore generated across the capacitor 324. The initial voltage signal $V_{SI}$ is proportional to the value of the current $I_{PB}$ shown in FIG. 3. A transistor 309 is coupled in parallel with the capacitor 324 to discharge the capacitor 324. A switch 315 serves to periodically sample the initial voltage signal $V_{SI}$ from the capacitor 324 to a capacitor 325. Then the current-waveform signal $V_B$ is generated across the capacitor 325.

An inverter 351, a current source 352, a transistor 353, a capacitor 354, and an AND gate 355 form a first time-delay circuit. An inverter 361, a current source 362, a transistor 363, a capacitor 364, an AND gate 365 and an inverter 366 form a first one-shot signal generator to output a store signal STR. The store signal STR is a one-shot signal. The switching signal $V_{PWM}$ is supplied to an input of the first time-delay circuit. A current $I_{352}$ of the current source 352 and the capacitance of the capacitor 354 determine a delay time of the first time-delay circuit. An output of the first time-delay circuit is coupled to an input of the first one-shot signal generator. A current $I_{362}$ of the current source 362 and the capacitance of the capacitor 364 determine the pulse width of the store signal STR. The store signal STR controls the switch 314 to sample the initial value of the primary side switching current signal $V_{IP}$. Therefore the store signal STR is generated in response to the rising edge of a delayed switching signal. The delayed switching signal is generated in response to a rising edge of the switching signal $V_{PWM}$ after the delay time. The delay time serves to avoid sampling from the interference of the switching spike.

Figure 7:
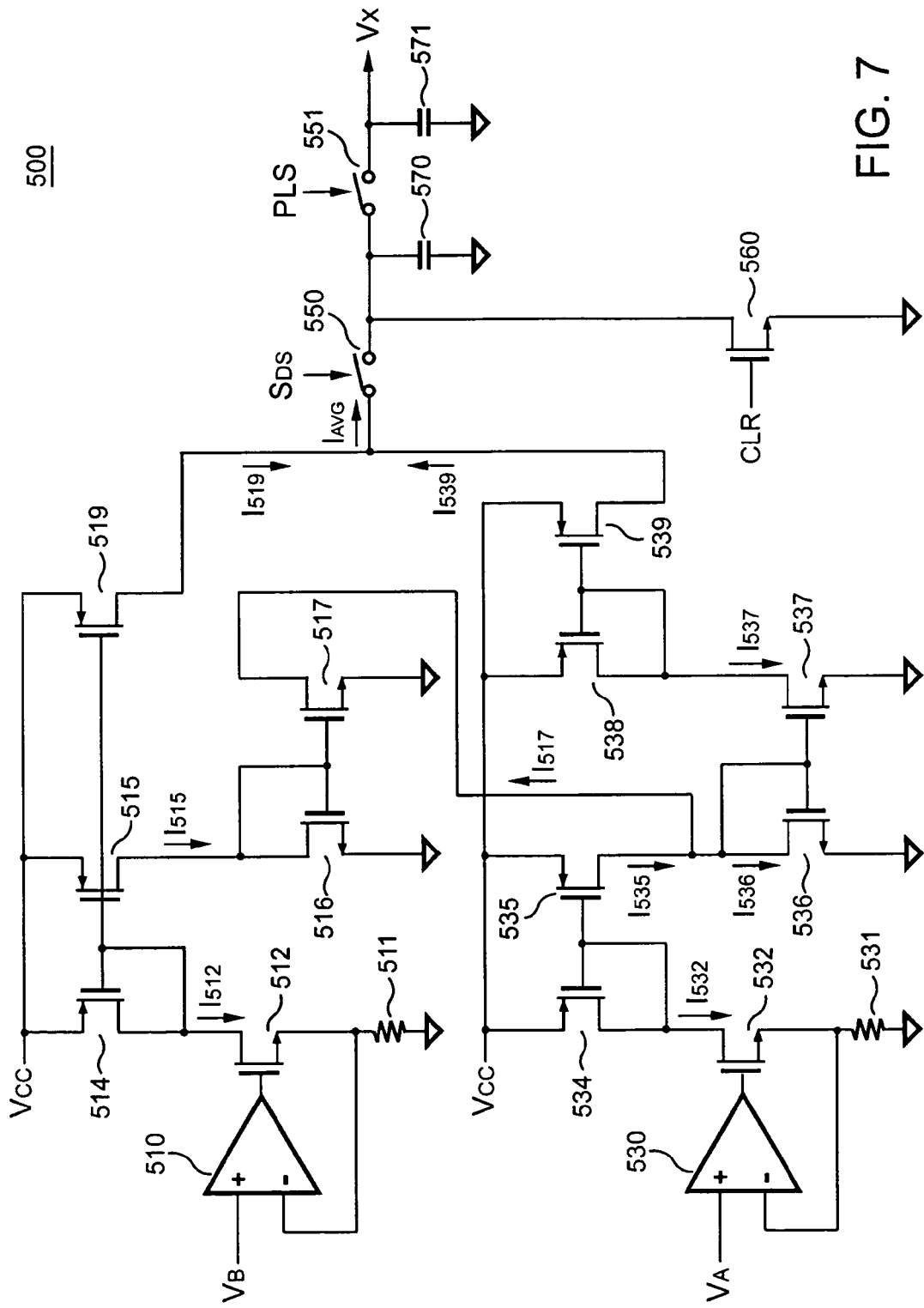
FIG. 7 illustrates a schematic circuit diagram of an integrator according to one embodiment of the present invention.

Referring to FIG. 7, it illustrates a schematic circuit diagram of an integrator 500 according to one embodiment of the present invention. An operational amplifier 510, a resistor 511 and a transistor 512 construct a first V-to-I converter to generate a first programmable current $I_{512}$ in response to the voltage of the current-waveform signal $V_B$. Transistors 514, 515 and 519 form a first current mirror for producing a current $I_{515}$ and a current $I_{519}$ by mirroring the first programmable current $I_{512}$. Transistors 516 and 517 form a second current mirror for generating a current $I_{517}$ by mirroring the current $I_{515}$.

An operational amplifier 530, a resistor 531 and a transistor 532 form a second V-to-I converter for generating a second programmable current $I_{532}$ in response to the voltage of the current-waveform signal $V_A$. Transistors 534 and 535 form a third current mirror for producing a current $I_{535}$ by mirroring the second programmable current $I_{532}$. Transistors 536 and 537 develop a fourth current mirror for producing a current $I_{537}$ in response to the current $I_{535}$ and the current $I_{517}$. The current $I_{537}$ can be expressed by, $$I_{537} = I_{535} - I_{517}$$

in which $I_{537}=I_{535}-I_{517}$. The geometric size of the transistor 536 is twice the size of the transistor 537. Therefore the current $I_{537}$ is the current $I_{536}$ divided by 2. Transistors 538 and 539 form a fifth current mirror for generating a current $I_{539}$ by mirroring the current $I_{537}$. The drains of the transistor 519 and the transistor 539 are coupled together for generating the average current signal $I_{AVG}$ by summing the current $I_{159}$ and the current $I_{539}$. The average current signal $I_{AVG}$ can be expressed by, $$I_{AVG} = \frac{V_B}{R_{511}} + \frac{\left(\frac{V_A}{R_{531}} - \frac{V_B}{R_{511}}\right)}{2} \quad (14)$$

The resistor 511, the resistor 531 and the capacitor 570 determine the time constant of the integrator 500, in which the resistor 531 is correlated to the resistor 511. As the resistance of the resistor 531 is set equal to the resistance of the resistor 511, the equation (14) can be thus rewritten as, $$I_{AVG} = \frac{1}{R_{511}} \times \left(V_B + \frac{V_A - V_B}{2}\right) \quad (15)$$

A switch 550 is coupled between the drain of the transistor 519 and a capacitor 570. The switch 550 is turned on only during the period of the discharge time $T_{DS}$ of secondary side switching current $I_S$. A transistor 560 is coupled in parallel with the capacitor 570 to discharge the capacitor 570. A switch 551 serves to periodically sample the voltage across the capacitor 570 to an output capacitor 571. The integrated signal $V_X$ is therefore generated across the output capacitor 571.

$$V_X = \frac{1}{R_{511}C_{570}} \times \left(V_B + \frac{V_A - V_B}{2}\right) \times T_{DS} \quad (16)$$

Figure 8:
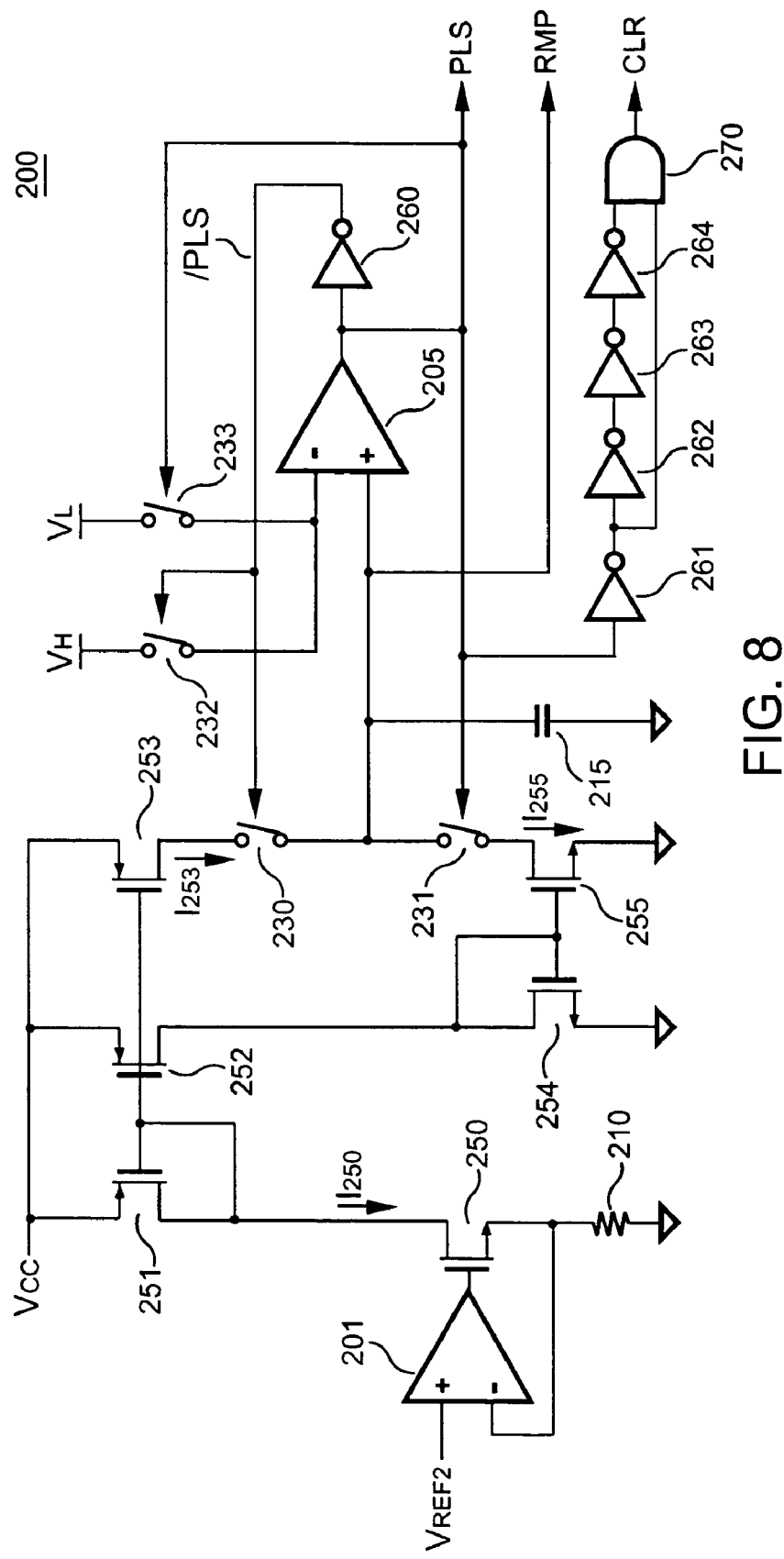
FIG. 8 illustrates a schematic circuit diagram of an oscillator according to one embodiment of the present invention.

Referring to FIG. 8, it illustrates a schematic diagram of the oscillator 200 according to one embodiment of the present invention. An operational amplifier 201, a resistor 210 and a transistor 250 form a third V-to-I converter. The third V-to-I converter generates a reference current $I_{250}$ in response to a reference voltage $V_{REF2}$. A plurality of transistors, such as 251, 252, 253, 254, 255 form current mirrors for generating an oscillator charge current $I_{253}$ and an oscillator discharge current $I_{255}$ in response to the reference current $I_{250}$. A drain of the transistor 253 generates the oscillator charge current $I_{253}$. A drain of the transistor 255 generates the oscillator discharge current $I_{255}$. A switch 230 is coupled between the drain of the transistor 253 and a capacitor 215. A switch 231 is coupled between the drain of the transistor 255 and the capacitor 215. The ramp signal RMP is obtained across the capacitor 215. A comparator 205 has a positive input connected to the capacitor 215. The comparator 205 outputs a oscillation signal PLS. The oscillation signal PLS determines the switching frequency and turns on/off the switches 312, 315 and 551. A first terminal of a switch 232 is supplied with a high-threshold voltage $V_H$. A first terminal of a switch 233 is supplied with a low-threshold voltage $V_L$. A second terminal of the switch 232 and a second terminal of the switch 233 are both coupled to a negative input of the comparator 205. An input of an inverter 260 is coupled to an output of the comparator 205 for generating an inverse oscillation signal /PLS. The oscillation signal PLS turns on/off the switch 231 and the switch 233. The inverse oscillation signal /PLS turns on/off the switch 230 and the switch 232. Inverters 261, 262, 263 and 264 are coupled in series. An input of the inverter 261 is supplied with the oscillation signal PLS. An AND gate 270 generates a clear signal CLR. A first input of the AND gate 270 is coupled to an output of the inverter 264. A second input of the AND gate 270 is coupled to an output of the inverter 261. The clear signal CLR turns on/off the transistors 308, 309 and 560. The resistance $R_{210}$ of the resistor 210 and the capacitance of the capacitor 215 determine the switching period T of the switching signal $V_{PWM}$.

$$T = \frac{C_{215} \times V_{OSC}}{V_{REF2}/R_{210}} = R_{210} \times C_{215} \times \frac{V_{OSC}}{V_{REF2}} \quad (17)$$

where $V_{OSC}=V_H-V_L$ and $C_{215}$ is the capacitance of the capacitor 215.

Figure 9:
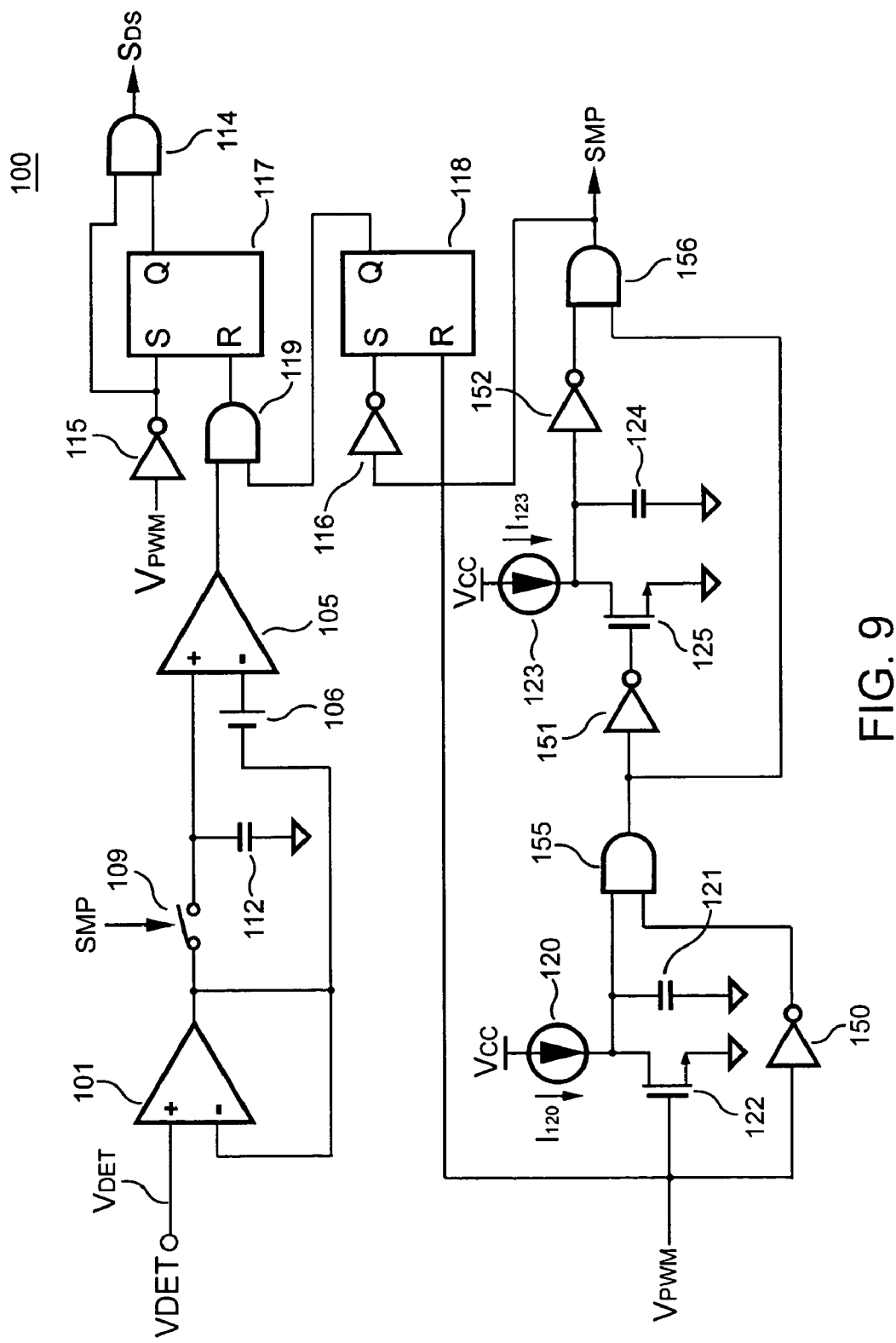
FIG. 9 illustrates a schematic diagram of a discharge-time detector according to one embodiment of the present invention.

Referring to FIG. 9, it illustrates a schematic diagram of the discharge-time detector 100 according to one embodiment of the present invention. An inverter 150, a transistor 122, a constant current source 120, a capacitor 121 and an AND gate 155 form a second time-delay circuit. An input of the second time-delay circuit is supplied with the switching signal $V_{PWM}$. The second time-delay circuit provides a propagation delay for the falling edge of the switching signal $V_{PWM}$. A current $I_{120}$ of the constant current source 120 and the capacitance of the capacitor 121 determine the timing of the propagation delay. An inverter 151, an inverter 152, a transistor 125, a constant current source 123, a capacitor 124 and an AND gate 156 form a second one-shot signal generator for generating a voltage-sample signal SMP. An input of the second one-shot signal generator is coupled to an output of the second time-delay circuit, which is also an output of the AND gate 155. A current $I_{123}$ of the constant current source 123 and the capacitance of the capacitor 124 determine the pulse width of the voltage-sample signal SMP.

An operational amplifier 101 performs as a buffer amplifier. A negative input and an output of the operational amplifier 101 are coupled together. A positive input of the operational amplifier 101, which is also an input of the buffer amplifier, is coupled to the voltage-detection terminal VDET. The voltage-detection terminal VDET is coupled to the auxiliary winding $N_A$ of the transformer 10 via the resistor 50 for detecting the reflected voltage $V_{AUX}$. A switch 109 is coupled between an output of the buffer amplifier and a capacitor 112. The switch 109 is turned on/off by the voltage-sample signal SMP. Therefore, the reflected voltage $V_{AUX}$ is sampled as a voltage $V_{DET}$. The voltage $V_{DET}$ will be held across the capacitor 112. A comparator 105 is utilized to detect the decrease of the reflected voltage $V_{AUX}$. A positive input of the comparator 105 is coupled to the capacitor 112. A reference voltage 106 is coupled between a negative input of the comparator 105 and the output of the buffer amplifier to provide a threshold for detecting the decrease of the reflected voltage $V_{AUX}$. Therefore, the comparator 105 outputs a logic-high signal as the decrement of the reflected voltage $V_{AUX}$ is beyond the voltage of the reference voltage 106. An input of an inverter 115 is supplied with the switching signal $V_{PWM}$. An input of an inverter 116 is supplied with the voltage-sample signal SMP. An AND gate 119 has a first input connected to an output of the comparator 105. A SR flip-flop 117 and a SR flip-flop 118 have a rising-edge triggered set-input and a high-level triggered reset-input respectively. The set-input of the SR flip-flop 118 is coupled to an output of the inverter 116. The reset-input of the SR flip-flop 118 is supplied with the switching signal $V_{PWM}$. An output of the SR flip-flop 118 is coupled to a second input of the AND gate 119. An output of the SR flip-flop 117 is coupled to a first input of an AND gate 114. A second input of the AND gate 114 is coupled to the output of the inverter 115. An output of the AND gate 114 serves to generate a discharge-time signal $S_{DS}$. The set-input of the SR flip-flop 117 is also coupled to the output of the inverter 115. The reset-input of the SR flip-flop 117 is coupled to an output of the AND gate 119. The discharge-time signal $S_{DS}$ turns on/off the switch 550. The pulse width of the discharge-time signal $S_{DS}$ is correlated to the discharge-time $T_{DS}$ of the secondary side switching current $I_S$.

According to the preferred embodiment illustrated in FIGS. 4, and 6~8, the integrated signal $V_X$ is correlated to the secondary side switching current $I_S$ and the output current $I_O$ of the power converter. Thus, the equation (11) can be rewritten as, $$V_X = m \times \frac{T_{NS}}{T_{NP}} \times R_S \times I_O \qquad (18)$$

where m is a constant, which can be determined by, $$m = \frac{R_{210} \times C_{215}}{R_{511} \times C_{570}} \times \frac{V_{OSC}}{V_{REF2}} \qquad (19)$$

The resistance $R_{511}$ of the resistor 511 is correlated to the resistance $R_{210}$ of the resistor 210. The capacitance $C_{570}$ of the capacitor 570 is correlated to the capacitance $C_{215}$ of the capacitor 215. Therefore, the integrated signal $V_X$ is proportional to the output current $I_O$ of the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit for controlling an output current at a primary side of a power converter, comprising:
    a waveform detector, generating a current-waveform signal by sampling a primary side switching current of a transformer through a current-sense device;
    a discharge-time detector, coupled to said transformer for detecting a discharging time of a secondary side switching current;
    an integrator, for generating an integrated signal in response to said discharging time and said current-waveform signal; and
    a switching control circuit, including a reference voltage, wherein said switching control circuit generates a switching signal in response to said integrated signal and said reference voltage; wherein said switching signal switches said transformer and regulating the output current of said power converter in accordance with said reference voltage.

2. The control circuit as recited in claim 1, further comprising an oscillator, for generating an oscillation signal for determining a switching frequency of said switching signal.

3. The control circuit as recited in claim 1, wherein a time constant of said integrator is correlated with a switching period of said switching signal.

4. The control circuit as recited in claim 1, wherein said waveform detector comprises:
    a first comparator, having a positive input coupled to a current-sense terminal, wherein said current-sense terminal includes a primary side switching current signal, wherein a value of said primary side switching current signal is proportional to a value of said primary side switching current;
    a first capacitor, for holding a peak value of said primary side switching current signal, wherein a negative input of said first comparator is coupled to said first capacitor;
    a first constant current source, for charging said first capacitor;
    a first switch, coupled between said first constant current source and said first capacitor, wherein said first switch is turned on/off by an output of said first comparator;
    a first transistor, coupled in parallel with said first capacitor for discharging said first capacitor;
    a second capacitor, for holding an initial value of said primary side switching current signal;
    a second switch, coupled between said current-sense terminal and said second capacitor, wherein said second switch is turned on/off by a store signal, wherein said store signal is a pulse signal generated in response to the rising edge of a delayed switching signal, wherein said delayed switching signal is generated in response to the rising edge of said switching signal after a delay time;
    a second transistor, coupled in parallel with said second capacitor for discharging said second capacitor;
    a third capacitor;
    a third switch, for periodically sampling a voltage across said first capacitor to said third capacitor;
    a fourth capacitor; and
    a fourth switch, for periodically sampling a voltage across said second capacitor to said fourth capacitor, wherein said current-waveform signal is obtained across said third capacitor and said fourth capacitor, wherein said third capacitor generates a first current-waveform signal and said fourth capacitor generates a second current-waveform signal.

5. The control circuit as recited in claim 1, wherein said integrator comprises:
    a first V-to-I converter, having a first timing operational amplifier, a first timing resistor and a plurality of first timing transistors, wherein said first V-to-I converter generates a first programmable charge current in response to said second current-waveform signal;
    a second V-to-I converter, having a second timing operational amplifier, a second timing resistor and a plurality of second timing transistors, wherein said second V-to-I converter generates a second programmable charge current in response to said first current-waveform signal and said second current-waveform signal, wherein said second timing resistor is correlated to said first timing resistor;
    a timing capacitor;
    a fifth switch, wherein a first terminal of said fifth switch is supplied with an average current signal and a second terminal of said fifth switch is coupled to said timing capacitor, wherein said average current signal is generated by summing said first programmable charge current and said second programmable charge current;

a third transistor, coupled in parallel with said timing capacitor to discharge said timing capacitor;

an output capacitor; and a sixth switch, for periodically sampling a voltage across said timing capacitor to said output capacitor, wherein said integrated signal is obtained across said output capacitor.

6. The control circuit as recited in claim 2, wherein said oscillator comprises:

a third V-to-I converter, having an osc operational amplifier, an osc resistor, an osc transistor, wherein said third V-to-I converter generates a reference current;

a first osc current mirror, having a first osc transistor, a second osc transistor and a third osc transistor, wherein said third osc transistor generates an osc charge current;

a second osc current mirror, having a fourth osc transistor and a fifth osc transistor, wherein said fifth osc transistor generates an osc discharge current;

an osc capacitor;

a first osc switch, coupled between a drain of said third osc transistor and said osc capacitor;

a second osc switch, coupled between osc capacitor and a drain of said fifth osc transistor;

an osc comparator, having a positive input coupled to said osc capacitor, wherein said osc comparator generates a oscillation signal, wherein said oscillation signal determines said switching frequency, wherein said oscillation signal turns on/off said third switch and said fourth switch;

a third osc switch, having a first terminal supplied with a high-threshold voltage and a second terminal coupled to a negative input of said osc comparator;

a fourth osc switch, having a first terminal supplied with a low-threshold voltage and a second terminal coupled to said negative input of said osc comparator;

an osc inverter, having an input coupled to an output of said osc comparator for producing an inverse oscillation signal, wherein said oscillation signal turns on/off said second osc switch and said fourth osc switch, wherein said inverse oscillation signal turns on/off said first osc switch and said third osc switch;

a first inverter, a second inverter, a third inverter and a fourth inverter coupled in series, wherein an input of said first inverter is supplied with said oscillation signal; and an AND gate, for generating a clear signal, wherein a first input of said AND gate is coupled to an output of said fourth inverter, wherein a second input of said AND gate is coupled to an output of said first inverter, wherein said clear signal turns on/off said first transistor, said second transistor and said third transistor.

7. The control circuit as recited in claim 1, wherein said discharge-time detector comprises:

a delay circuit, having a first zcd inverter, a first zcd transistor, a first zcd constant current source, a first zcd capacitor and a first zcd AND gate, wherein an input of said delay circuit is supplied with said switching signal, wherein said delay circuit provides a propagation delay for a falling edge of said switching signal, wherein the timing of said propagation delay is determined by a current of said first zcd constant current source and a capacitance of said first zcd capacitor;

an one-shot signal generator, having a second zcd inverter, a third zcd inverter, a second zcd transistor, a second zcd constant current source, a second zcd capacitor and a second zcd AND gate, wherein said one-shot signal generator generates a voltage sample signal, wherein an input of said one-shot signal generator is coupled to an output of said delay circuit, wherein a pulse width of said voltage sample signal is determined by a current of said second zcd constant current source and a capacitance of said second zcd capacitor;

a zcd operational amplifier, performing as a buffer amplifier, wherein a positive input of said zcd operational amplifier is coupled to a voltage-detection terminal, wherein said voltage-detection terminal is coupled to said auxiliary winding of said transformer via a zcd resistor;

a sampling capacitor;

a sampling switch, coupled between an output of said buffer amplifier and said sampling capacitor, wherein said voltage sample signal turns on/off said sampling switch;

a zcd comparator, wherein a positive input of said zcd comparator is coupled to said sampling capacitor;

a reference voltage threshold, coupled between a negative input of said zcd comparator and said output of said buffer amplifier;

a fourth zcd inverter, having an input supplied with said switching signal;

a fifth zcd inverter, having an input supplied with said voltage sample signal;

a third zcd AND gate, having a first input coupled to an output of said zcd comparator;

a fourth zcd AND gate, for generating a discharge-time signal, wherein a first input of said fourth zcd AND gate is coupled to an output of said fourth zcd inverter;

a first SR flip-flop, having a set-input and a reset-input, wherein an output of said first SR flip-flop is coupled to a second input of said fourth zcd AND gate, wherein said set-input of said first SR flip-flop is coupled to said output of said fourth zcd inverter, wherein said reset-input of said first SR flip-flop is coupled to an output of said third zcd AND gate, wherein said discharge-time signal turns on/off of said fifth switch, wherein the pulse width of said discharge-time signal is correlated to said discharge-time of said secondary side switching current; and a second SR flip-flop, having a set-input and a reset-input, wherein said set-input of said second SR flip-flop is coupled to an output of said fifth zcd inverter, wherein said reset-input of said second SR flip-flop is supplied with said switching signal, wherein an output of said second SR flip-flop is coupled to a second input of said third zcd AND gate.

8. The control circuit as recited in claim 1, wherein a resistance of said first timing resistor is correlated to a resistance of said osc resistor and a capacitance of said timing capacitor is correlated to a capacitance of said osc capacitor.

9. A control circuit for controlling an output current at a primary-side of a power converter, comprising:

a waveform detector, for generating a current-waveform signal by sampling a primary side switching current signal, wherein said primary side switching current signal is generated from a primary side switching current of a transformer;

a discharge-time detector for detecting a discharging time of a secondary side switching current via an auxiliary winding of said transformer, wherein said secondary side switching current is generated from the secondary side of said transformer;

an oscillator, for generating an oscillation signal for determining a switching frequency of a switching signal, wherein said switching signal is used for switching said transformer and regulating the output of said power converter;

an integrator, for generating an integrated signal by integrating an average current signal with said discharging time, wherein said average current signal is generated in response to said current-waveform signal;

an error amplifier, having an operational amplifier and a reference voltage for amplifying said integrated signal and providing a loop gain for controlling the output current of said power converter; and a comparator, for controlling a pulse width of said switching signal in reference to an output of said error amplifier, wherein the output current of said power converter is regulated in response to said reference voltage.

10. The control circuit as recited in claim 9, wherein a time constant of said integrator is correlated with a switching period of said switching signal.

11. The control circuit as recited in claim 9, wherein said waveform detector comprises:

a first comparator, having a positive input coupled to a current-sense terminal, wherein said current-sense terminal includes said primary side switching current signal, wherein a value of said primary side switching current signal is proportional to a value of said primary side switching current;

a first capacitor, for holding a peak value of said primary side switching current signal, wherein a negative input of said first comparator is coupled to said first capacitor;

a first constant current source, for charging said first capacitor;

a first switch, coupled between said first constant current source and said first capacitor, wherein said first switch is turned on/off by an output of said first comparator;

a first transistor, coupled in parallel with said first capacitor for discharging said first capacitor;

a second capacitor, for holding an initial value of said primary side switching current signal;

a second switch, coupled between said current-sense terminal and said second capacitor, wherein said second switch is turned on/off by a store signal, wherein said store signal is a pulse signal generated in response to the rising edge of a delayed switching signal, wherein said delayed switching signal is generated in response to the rising edge of said switching signal after a delay time;

a second transistor, coupled in parallel with said second capacitor for discharging said second capacitor;

a third capacitor;

a third switch, for periodically sampling a voltage across said first capacitor to said third capacitor;

a fourth capacitor; and a fourth switch, for periodically sampling a voltage across said second capacitor to said fourth capacitor, wherein said current-waveform signal is obtained across said third capacitor and said fourth capacitor, wherein said third capacitor generates a first current-waveform signal and said fourth capacitor generates a second current-waveform signal.

12. The control circuit as recited in claim 9, wherein said integrator comprises:

a first V-to-I converter, having a first timing operational amplifier, a first timing resistor and a plurality of first timing transistors, wherein said first V-to-I converter generates a first programmable charge current in response to said second current-waveform signal;

a second V-to-I converter, having a second timing operational amplifier, a second timing resistor and a plurality of second timing transistors, wherein said second V-to-I converter generates a second programmable charge current in response to said first current-waveform signal and said second current-waveform signal, wherein said second timing resistor is correlated to said first timing resistor;

a timing capacitor;

a fifth switch, wherein a first terminal of said fifth switch is supplied with an average current signal and a second terminal of said fifth switch is coupled to said timing capacitor, wherein said average current signal is generated by summing said first programmable charge current and said second programmable charge current;

a third transistor, coupled in parallel with said timing capacitor to discharge said timing capacitor;

an output capacitor; and a sixth switch, for periodically sampling a voltage from said timing capacitor to said output capacitor, wherein said integrated signal is obtained across said output capacitor.

13. The control circuit as recited in claim 9, wherein said oscillator comprises:

a third V-to-I converter, having an osc operational amplifier, an osc resistor, an osc transistor, wherein said third V-to-I converter generates a reference current;

a first osc current mirror, having a first osc transistor, a second osc transistor and a third osc transistor, wherein said third osc transistor generates an osc charge current;

a second osc current mirror, having a fourth osc transistor and a fifth osc transistor, wherein said fifth osc transistor generates an osc discharge current;

an osc capacitor;

a first osc switch, coupled between a drain of said third osc transistor and said osc capacitor;

a second osc switch, coupled between said osc capacitor and a drain of said fifth osc transistor;

an osc comparator, having a positive input coupled to said osc capacitor, wherein said osc comparator generates a oscillation signal, wherein said oscillation signal determines said switching frequency, wherein said oscillation signal turns on/off said third switch and said fourth switch;

a third osc switch, having a first terminal supplied with a high-threshold voltage and a second terminal coupled to a negative input of said osc comparator;

a fourth osc switch, having a first terminal supplied with a low-threshold voltage and a second terminal coupled to said negative input of said osc comparator;

an osc inverter, having an input coupled to an output of said osc comparator for producing an inverse oscillation signal, wherein said oscillation signal turns on/off said second osc switch and said fourth osc switch, wherein said inverse oscillation signal turns on/off said first osc switch and said third osc switch;

a first inverter, a second inverter, a third inverter and a fourth inverter coupled in series, wherein an input of said first inverter is supplied with said oscillation signal; and an AND gate, for generating a clear signal, wherein a first input of said AND gate is coupled to an output of said fourth inverter, wherein a second input of said AND gate is coupled to an output of said first inverter, wherein said clear signal turns on/off said first transistor, said second transistor and said third transistor.

14. The control circuit as recited in claim 9, wherein said discharge-time detector comprises:

a delay circuit, having a first zcd inverter, a first zcd transistor, a first zcd constant current source, a first zcd capacitor and a first zcd AND gate, wherein an input of said delay circuit is supplied with said switching signal, wherein said delay circuit provides a propagation delay for a falling edge of said switching signal, wherein the timing of said propagation delay is determined by the current of said first zcd constant current source and a capacitance of said first zcd capacitor;

an one-shot signal generator, having a second zcd inverter, a third zcd inverter, a second zcd transistor, a second zcd constant current source, a second zcd capacitor and a second zcd AND gate, wherein said one-shot signal generator generates a voltage sample signal, wherein an input of said one-shot signal generator is coupled to an output of said delay circuit, wherein a pulse width of said voltage sample signal is determined by a current of said second zcd constant current source and a capacitance of said second zcd capacitor;

a zcd operational amplifier, performing as a buffer amplifier, wherein a positive input of said zcd operational amplifier is coupled to a voltage-detection terminal, wherein said voltage-detection terminal is coupled to said auxiliary winding of said transformer via a zcd resistor;

a sampling capacitor;

a sampling switch, coupled between an output of said buffer amplifier and said sampling capacitor, wherein said voltage sample signal turns on/off said sampling switch;

a zcd comparator, wherein a positive input of said zcd comparator is coupled to said sampling capacitor;

a reference voltage threshold, coupled between a negative input of said zcd comparator and said output of said buffer amplifier;

a fourth zcd inverter, having an input supplied with said switching signal;

a fifth zcd inverter, having an input supplied with said voltage sample signal;

a third zcd AND gate, having a first input coupled to an output of said zcd comparator;

a fourth zcd AND gate, for generating a discharge-time signal, wherein a first input of said fourth zcd AND gate is coupled to an output of said fourth zcd inverter;

a first SR flip-flop, having a set-input and a reset-input, wherein an output of said first SR flip-flop is coupled to a second input of said fourth zcd AND gate, wherein said set-input of said first SR flip-flop is coupled to said output of said fourth zcd inverter, wherein said reset-input of said first SR flip-flop is coupled to an output of said third zcd AND gate, wherein said discharge-time signal turns on/off of said fifth switch, wherein the pulse width of said discharge-time signal is correlated to said discharge-time of said secondary side switching current; and a second SR flip-flop, having a set-input and a reset-input, wherein said set-input of said second SR flip-flop is coupled to an output of said fifth zcd inverter, wherein said reset-input of said second SR flip-flop is supplied with said switching signal, wherein an output of said second SR flip-flop is coupled to a second input of said third zcd AND gate.

15. The control circuit as recited in claim 9, wherein a resistance of said first timing resistor is correlated to a resistance of said osc resistor and a capacitance of said timing capacitor is correlated to a capacitance of said osc capacitor.

* * * * *